United States Patent

Oppenheimer et al.

[15] 3,640,735
[45] Feb. 8, 1972

[54] FIBROUS REINFORCED POLYVINYL ALCOHOL CASINGS

[72] Inventors: Seymour Oppenheimer, Chicago; Albin F. Turbak, Danville, both of Ill.

[73] Assignee: Tee-Pak, Inc., Chicago, Ill.

[22] Filed: Oct. 18, 1968

[21] Appl. No.: 768,625

[52] U.S. Cl. ......................... 99/176, 161/88, 260/91.3 VA
[51] Int. Cl. ....................................................... A22c 13/00
[58] Field of Search ............. 99/171, 174, 176, 175; 161/88, 161/247; 117/94; 260/91.3 VA; 156/237

[56] References Cited

UNITED STATES PATENTS

| | | | |
|---|---|---|---|
| 2,169,250 | 8/1939 | Ezard | 99/176 UX |
| 2,590,221 | 3/1952 | Stevens | 99/174 UX |
| 2,697,664 | 12/1954 | Goeser | 99/174 |
| 2,952,550 | 9/1960 | Parlour | 99/176 |
| 3,329,509 | 7/1967 | Julius | 99/176 X |
| 2,210,436 | 8/1940 | Weingand | 99/176 |
| 3,505,264 | 4/1970 | Thoese | 260/91.3 X |
| 2,993,825 | 7/1961 | Gage | 161/88 X |
| 3,061,458 | 10/1962 | Arquette | 260/91.3 UA |
| 3,320,200 | 5/1967 | Kose | 156/327 X |
| 3,516,960 | 6/1970 | Martins | 99/176 X |

FOREIGN PATENTS OR APPLICATIONS

| | | | |
|---|---|---|---|
| 386,161 | 1/1933 | Great Britain | 99/176 |
| 471,724 | 9/1937 | Great Britain | 99/176 |

Primary Examiner—Frank W. Lutter
Assistant Examiner—Robert Halper
Attorney—Neal J. Mosely

[57] ABSTRACT

A novel fibrous casing for packaging sausages and other meat and food products comprises a saturating tissue, preferably a long fiber hemp paper, coated or impregnated with an insolublized polyvinyl alcohol. The casing is preferably prepared by coating and impregnating a saturating tissue with an aqueous solution of polyvinyl alcohol which is then insolublized, preferably by cross-linking with a suitable cross-linking agent, viz formaldehyde, etc. The saturating tissue may be coated and impregnated with the polyvinyl alcohol solution and immediately formed into a tubular casing or may be coated and impregnated in sheet form and dried and subsequently slit to size and formed into a tubular casing in a separate seaming operation. Casings are preferably formed using long fiber hemp paper as the saturating tissue and using polyvinyl alcohol having a D.S. of OH groups of at least 95 percent.

13 Claims, 7 Drawing Figures

FIG. 1

SEYMOUR OPPENHEIMER
ALBIN F TURBAK
INVENTORS

SEYMOUR OPPENHEIMER
ALBIN F TURBAK
*INVENTORS*

BY

*their attorney*

FIBROUS REINFORCED POLYVINYL ALCOHOL CASINGS

BACKGROUND OF THE INVENTION

1. Field of the Invention

This invention relates to new and improved sausage casings and more particularly to sausage casings prepared from polyvinyl alcohol. The invention is primarily directed to the production of novel fibrous casings comprising a tubular insolubilized polyvinyl alcohol film reinforced with a fibrous web, preferably a saturating tissue such as a long fiber hemp tissue.

2. Description of the Prior Art

Natural casings are prepared from the intestines of various edible animals, primarily cattle, hogs and sheep. The intestines are removed from the slaughtered animal and thoroughly cleaned by processes well known in the art. Natural casings, which have been thoroughly cleaned, are stuffed with various sausage meat compositions and formed into sausage links in preparation for cooking.

Prior to about 1925, substantially all sausage casings were natural casings prepared from animal intestines. Since that time, there have been developed several types of synthetic sausage casings. Some artificial sausage casings are prepared by reconstitution of a tubular film from animal hide fibers to yield a tough collagenous film. The major proportion of artificial casings, however, are prepared from regenerated cellulose, preferably by the viscose process, although some casings are manufactured by the cuprammonium process and also by denitration of extruded cellulose nitrate tubes.

There has been a considerable consumer acceptance of presliced sausages, such as bologna, salami, etc., which are sold in the form of relatively small conveniently sized packages, each package containing a small predetermined quantity of sausage in the form of a fixed number of slices. The reason for this is that the slicing of the sausage is performed mechanically, thus yielding a product of uniform thickness for ease of packaging. In order to provide a predetermined number of slices in a package of a given weight it is essential that the diameter of the sausage be carefully controlled. In the preparation of sausages by the meat packer, a sausage emulsion is inserted into the sausage casing which is subsequently tied off at each end and cooked or cooked and smoked. In order to assure uniformity of size of the sausage slices, casings are provided to the trade known as fibrous casings. Fibrous casing is composed of cellulosic fibers, preferably in the form of a paper, which are impregnated and held together by regenerated cellulose. The paper which is used is usually a saturating tissue, preferably a long fiber hemp paper, which is impregnated with viscose, formed into a tube, and treated in a coagulating and regenerating bath to regenerate cellulose within and upon the paper. The product is a fiber reinforced regenerated cellulose casing having relatively high strength and relatively low stretch.

Over a period of many years, cellulose casings have remained the most desirable and generally the most economical, in spite of the development of competing, cheaper plastics, because cellulose has properties of strength, both wet and dry, low stretch, and permeability to moisture vapor and smoke, which are required in the processing sausage products. Other plastics, such as polyethylene, polyvinyl chloride, etc., which are easy to process in film form have never produced satisfactory sausage casings because of a deficiency in smoke or moisture vapor permeability. Also, most of the common plastic packaging films are too stretchy for use in the formation of sausage casings. Polyvinyl alcohol has the advantage of being easily formed into films which have a high-moisture vapor and smoke permeability but is excessively stretchy, particularly when wet. Polyvinyl alcohol films have satisfactory dry strength but when wet exhibit a stretch of up to 700 percent at break load.

STATEMENT OF OBJECTS AND FEATURES OF THE INVENTION

It is therefore one object of this invention to provide a new and improved fibrous reinforced polyvinyl alcohol sausage casing and method of preparing the same.

Another object of this invention is to provide a new and improved method for preparing fibrous reinforced polyvinyl alcohol casings by impregnation of a fibrous web from aqueous solution.

Another object of this invention is to provide a new and improved polyvinyl alcohol reinforced fibrous casing having high strength and low stretch under rewet conditions.

A feature of this invention is the provision of a new and improved casing comprising a tubular fibrous reinforced polyvinyl alcohol film, insolubilized by treatment with a cross-linking agent.

Another feature of this invention is the provision of a new and improved method for the preparation of fibrous casing by coating and impregnating a saturating tissue, preferably a long fiber hemp paper, with an aqueous solution of polyvinyl alcohol and drying and insolubilizing the polyvinyl alcohol in the tissue.

Another feature of this invention comprises a new and improved method for the preparation of fibrous casing wherein a saturating tissue is impregnated and coated with polyvinyl alcohol, which is insolubilized therein, and subsequently formed into a tube.

Other objects and features of this invention will become apparent from time to time throughout the specification and claims as hereinafter related.

SUMMARY OF THE INVENTION

This invention comprises a new and improved fibrous casing and method of preparing the same. A saturating tissue, preferably a long fiber hemp paper, is impregnated and coated with an aqueous solution of polyvinyl alcohol and the impregnated or coated paper dried and the polyvinyl alcohol insolubilized thereon. The polyvinyl alcohol is insolubilized by treatment with a cross-linking agent, such as formaldehyde, etc., which may be incorporated in the polyvinyl alcohol solution or added in a separate treating step. The finished fibrous reinforced polyvinyl alcohol film may be formed into a tubular casing at the time of impregnation and drying or may be cut to desired size after drying and the narrower widths formed into tubular casings by a suitable adhesive seaming step. In carrying out this process it is preferred to use a polyvinyl alcohol having a D.S. of OH groups in excess of 80 percent and preferably having a D.S. in excess of 95 percent.

DESCRIPTION OF THE PREFERRED EMBODIMENTS

This invention relates to new and useful improvements in food casings and more particularly to new and improved fibrous casings for use in packaging or processing sausage or meat or other food products. In the preferred embodiments of this invention an aqueous solution of polyvinyl alcohol is impregnated in and coated upon a fibrous web, preferably a saturating tissue such as a long fiber hemp paper. The polyvinyl alcohol solution may be applied by any of a variety of well-known coating techniques. The impregnated and coated fibrous web may be dried and subsequently slit and formed into tubular casings of desired size or may be directly formed into a tubular casing at the time of impregnation or coating. In either case, the polyvinyl alcohol is insolubilized after coating and impregnation on the fibrous web by treatment with a suitable cross-linking agent, which may, if desired, be incorporated in the polyvinyl alcohol solution.

The term "polyvinyl alcohol," as used herein, is intended to cover vinyl polymers having a D.S. with respect to OH groups in the range from 80–100 percent (D.S. 0.80–1.0). Vinyl alcohol, as a monomer, is not known to exist. All attempts to prepare vinyl alcohol have resulted in the rearrangement of the compound to acetaldehyde. Polyvinyl alcohol is normally prepared by hydrolysis of polyvinyl esters, such as polyvinyl acetate, etc., usually in aqueous alcohol. As a result, the compounds which are known as "polyvinyl alcohol" commercially may vary considerably in D.S. (degree of substitution) with respect to the OH content. At a D.S., with respect to OH groups, less than about 80 percent, the polymer is normally referred to as a polyvinyl alcohol-polyvinyl ester copolymer. At a D.S., with respect to OH groups, above about 80 percent, the polymer is referred to as polyvinyl alcohol. For purposes of this invention, it is necessary to use polyvinyl alcohols having a D.S. in the range from 80–100 percent to obtain adequate solubility initially for coating and impregnating the fibrous web or saturating tissue and for providing adequate strength and resistance to moisture after drying. Polyvinyl alcohol having a D.S. of 98 percent or more, with respect to OH groups, has a very high water solubility initially and is easy to apply. However, when this high D.S. polyvinyl alcohol is thoroughly dried the resulting film is quite insoluble in cold water even without cross-linking. The cross-linked high D.S. polyvinyl alcohol is even stronger and less sensitive to water.

In applying the polyvinyl alcohol to fibrous webs in aqueous solution it is preferred to incorporate a cross-linking agent in the solution which will react with the polyvinyl alcohol during drying and heat curing to produce a film upon and within the fibrous web which is insoluble in and relatively insensitive to water. It is also possible to apply the polyvinyl alcohol from aqueous solution and subsequently treat the film with a cross-linking agent. The cross-linking agents which are applied to insolubilize the polyvinyl alcohol include a variety of cross-linking agents, preferably having two or more reactive functional groups per molecule. Suitable cross-linking agents include aldehydes such as formaldehyde, glyoxal, etc.; diisocyanates, such as the diisocyanate of dimerized linoleic acid, 4,4'-methylene bis (cyclohexyl isocyanate), etc.; diisothiocyanates, such as the diisothiocyanate of dimerized linoleic acid, 4,4'-methylene bis (cyclohexyl isocyanate), etc.; polyepoxides, such as butadiene diepoxide and the like; polyamide epichlorohydrine resin; acyl halides, such as adipoyl chloride, sebacoyl chloride, etc.; and polymeric ketenes, such as the diketene of dimerized linoleic acid. In applying the cross-linking agents to insolubilize polyvinyl alcohol, the less reactive cross-linking agents are applied in admixture with the aqueous solution of polyvinyl alcohol. In the case of more reactive cross-linking agents, the polyvinyl alcohol may be applied to the fibrous web and subsequently treated with the cross-linking agent in a separate treating step, preferably prior to drying and curing.

In preparing casings in accordance with this invention it is preferred to use a fibrous web comprising a saturating tissue formed of long hemp fibers bonded together with a suitable wet strength sizing agent, such as regenerated cellulose or an insolubilized polyvinyl alcohol. Other nonwoven webs, such as Yoshino paper, rice paper, hemp, rayon, cotton and nylon; and woven fabrics such as muslin, marquisette, cheese cloth, organdie, and voile can be used. It should be understood that these fibrous webs are commercially available. The long fiber hemp paper (Dexstar paper) is generally preferred for reasons of maximum strength, ease of handling, and economy.

APPARATUS AND PROCESS FOR CASING PREPARATION

Figure 1:
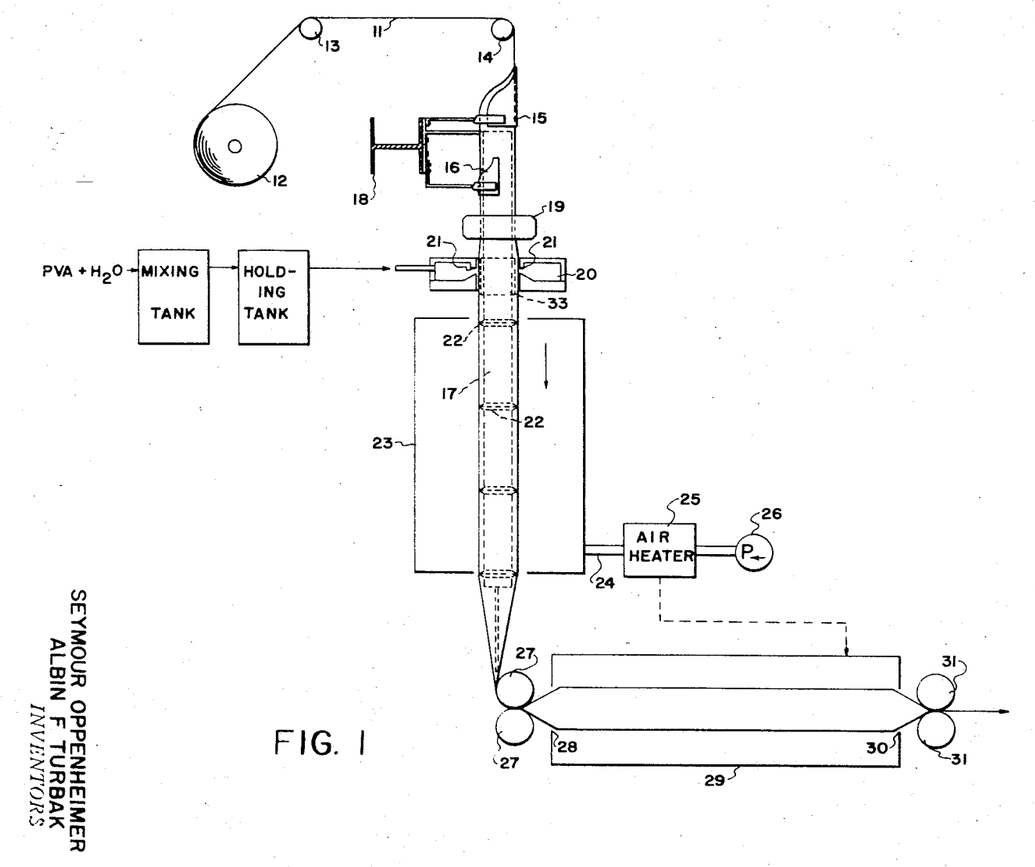
FIG. 1 is a diagrammatic view showing the continuous coating of a fibrous web and formations of the same into a casing in accordance with this invention.

Referring to FIG. 1 of the drawings, there is shown a diagrammatic view of an apparatus for coating or impregnating a fibrous web and forming the same into a fibrous casing in accordance with this invention.

In FIG. 1, a ribbon of paper 11, preferably of the type described in U.S. Pat. No. 2,045,349 which is a long fiber hemp paper weighing in the range from 12–16 pounds per ream, depending upon the size and weight of casing being manufactured, passes from roll 12 over rollers 13 and 14 and around formers 15 and 16 which form the paper into tubular form. The paper formed into a tube then proceeds downwardly over a mandrel 17. Mandrel 17, which is preferably a hollow metal tube, e.g., a steel pipe, having an outside diameter of 2 to 7 inches, more or less, depending upon the size of the tube or casing which is to be produced, may be of any suitable length, conveniently about 30 feet long, and, as shown, can be suspended from a suitable support such as an I-beam 18 or the like. The paper 11, now shaped in the form of a tube, passes downwardly over mandrel 17, through a forming ring 19 which is preferably a metallic ring having an inside diameter only slightly larger than the diameter of the tube shaped paper passing through it and whose purpose it is to maintain the paper in tubular form until it reaches the coating die 20. Coating die 20 is essentially a hollow ring structure made of metal or the like and contains an annular opening 21 circumferentially of its inside diameter through which an aqueous solution of polyvinyl alcohol, which is contained under positive pressure in the chamber of the die 20, is applied to the outer surface of the downwardly moving paper tube to uniformly coat it with polyvinyl alcohol. The polyvinyl alcohol solution is prepared in a mixing tank and supplied to a holding tank from which it is introduced to the die as indicated diagrammatically in FIG. 1.

A sleeve 33 formed of metal or the like which is shrunk onto mandrel 17 functions to effect a more uniform application of polyvinyl alcohol solution through the orifice 21 as the paper tube 11 passes downwardly thereover. A number of slip rings 22 which may be shrunk onto the mandrel 17 at suitable intervals, e.g., 3 feet, and which are made of metal or the like, function to keep the inside wall of the polyvinyl alcohol coated and/or impregnated paper tube from scrapping against the outside wall of mandrel 17 as the tube moves downwardly.

The apparatus is arranged with mandrel 17 extending through dryer chamber 23. Dryer chamber 23 is provided with a hot air inlet 24 supplied with air from heater 25 by means of a high capacity fan or pump 26. Dryer 23 is effective to produce a rapid preliminary drying of the polyvinyl alcohol coated or impregnated fibrous casing.

From the lower end of dryer 23, the dried fibrous casing is collapsed and passes through rolls 27 positioned at the inlet 28 to dryer 29. Dryer 29 is also provided with a pair of rolls 31 adjacent outlet 30 therefrom. Rolls 27 and 31 are effective to trap a "bubble" of air in the casing to maintain it under a desired inflating pressure to prevent the casing from shrinking during drying. Dryer 29 may be supplied with heated air from an alternate heater, not shown, or may be supplied with heated air from air heater 25 as indicated in dotted line. In preparing casing in accordance with this embodiment of the invention, the polyvinyl alcohol impregnated fibrous tube is dried thoroughly in dryer 23 and is cured in dryer 29. The casing is rehumidified to a desired moisture level either by introduction of moist air at the outlet end of the dryer or by subjecting the casing leaving the dryer to storage under moisture equilibration conditions.

While the arrangement for preparing polyvinyl alcohol coated and impregnated fibrous casing shown in FIG. 1 has the advantage of utilizing more or less standard equipment for the manufacture of cellulosic fibrous casings, the apparatus and procedures shown in FIGS. 2–7 have the advantage of higher speed operation. In FIGS. 2–7 of the drawing there are shown several different embodiments of flat web coaters for coating or impregnating a fibrous web with a polyvinyl alcohol solution and drying the same. In each case, the coated web is preferably stored on reels and subsequently slit to size and formed into tubular casing using conventional apparatus for forming and seaming longitudinally seamed tubes. The casing may be formed and seamed using any suitable adhesive for a polyvinyl alcohol film. Suitable adhesives include molten plasticized polyvinyl alcohol, polyvinyl alcohol in solution in volatile organic solvents, or reactive adhesives such as isocyanate, epoxy or similar adhesives.

Figure 2:
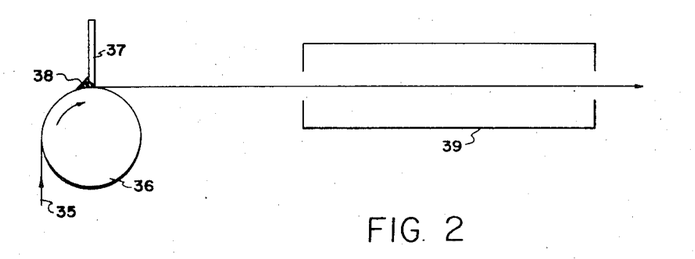
FIG. 2 is a diagrammatic view showing the application of polyvinyl alcohol solution to a fibrous web on a knife over roll coater.

In FIG. 2, there is illustrated a knife over roll-type coater for use in applying polyvinyl alcohol solutions to a fibrous web in accordance with this invention. A fibrous web 35, preferably a long fiber hemp paper or other saturating tissue, is fed over coating roll 36. A viscous solution of polyvinyl alcohol is applied to the upper surface of the web as indicated at 38 and metered by coating knife 37. The coated web passes through dryer 39 where the polyvinyl alcohol coating is thoroughly dried and cured and may be moisture equilibrated by introduction of moisture at a selected portion of the outlet end of the dryer. Alternatively, the coated dried and cured web coming out of dryer 39 may be subjected to a separate moisture equilibration step prior to reeling.

Figure 3:
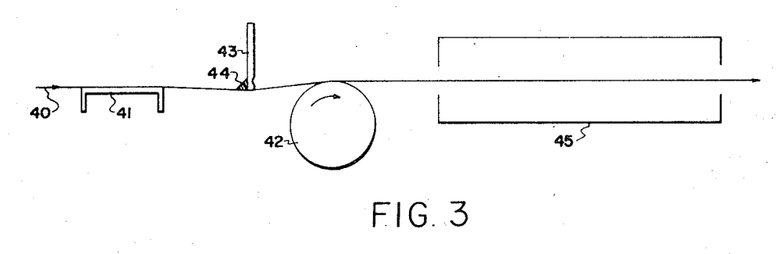
FIG. 3 is a diagrammatic view showing the application of a polyvinyl alcohol solution to a fibrous web using a floating doctor blade coater.

In FIG. 3 there is illustrated a floating doctor blade or air knife type coater for application of polyvinyl alcohol coatings to a fibrous web. Fibrous web 40 is passed over support channel 41 and idler roll 42. A floating doctor blade or air knife 43 is positioned between channel 41 and roll 42 and meters a viscous polyvinyl alcohol coating solution 44 onto the surface of web 40. The coated web 40 is then passed through dryer 45 where the coating is thoroughly dried, cured, and preferably reequilibrated with moisture. If desired, the moisture equilibration may be carried out in a separate step after the dryer. The floating doctor blade or air knife coater is operative primarily at low-speed coatings for nonwoven webs because of the relatively low wet strength of the web. This type coater is more effective for woven fabrics or for nonwoven webs which have been provided with a substantial loading of a wet strength additive.

Figure 4:
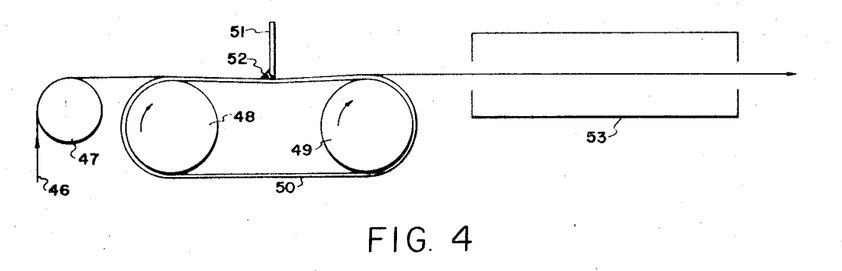
FIG. 4 is a diagrammatic view showing the application of polyvinyl alcohol solution to a fibrous web using a continuous blanket knife coater.

In FIG. 4, there is shown a modified type of floating doctor blade or air knife coater known as a continuous blanket knife coater. This coating apparatus is applicable to coating nonwoven webs at higher speeds since the web is supported at the point of application of the coating liquid and the doctor blade. In FIG. 4, the nonwoven web or saturating tissue 46 is introduced over idler roll 47. The apparatus includes idler roll 48 and drive roll 49 over which there is fed a continuous belt or blanket 50 for supporting the web being coated. Web 46 is supported by blanket 50 at the point of application of a viscous polyvinyl alcohol coating solution 52 which is doctored onto the web by doctor blade or coating knife 51. The coated web is passed through dryer 53 where it is dried, cured, and preferably moisture equilibrated. If desired, the reequilibration with moisture may take place in a separate step following the dryer.

Figure 5:
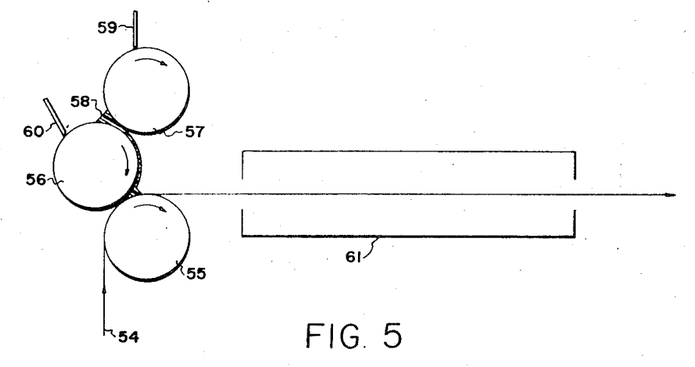
FIG. 5 is a diagrammatic view showing the application of polyvinyl alcohol solution to a fibrous web in a reverse roll coater.

In FIG. 5 there is shown a three-roll, reverse roll coater for applying polyvinyl alcohol solution to a fibrous web. In this coater, fibrous web 54 is passed over a rubber covered support roll 55 which is arranged for vertical adjustment to control thickness of coating applied. Adjacent to support roll 55 there is positioned a variable speed transfer roll 56 and doctor roll 57 which is preferably provided with a micrometer adjustment for controlling thickness of film. Doctor roll 57 is provided with a cleaning knife 59 and transfer roll 56 is provided with cleaning knife 60. The viscous coating solution is introduced between rolls 56 and 57 as shown at 58. In this apparatus, the coating material 58 is applied in a control thickness to transfer roll 56, the thickness being controlled by doctor roll 57. The coating from transfer roll 56 is transferred to web 54 which then passes into dryer 61. In dryer 61, the coated or impregnated web is thoroughly dried and cured and preferably reequilibrated with moisture. If desired, the moisture equilibration may be carried out in a separate step beyond the dryer.

Figure 6:
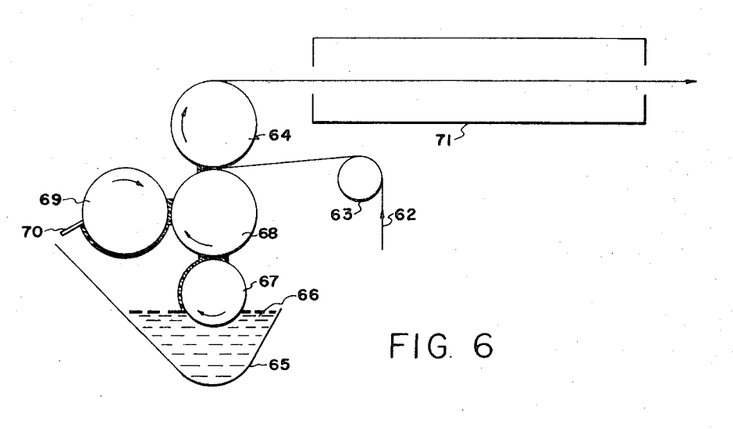
FIG. 6 is a diagrammatic view showing the application of polyvinyl alcohol solution to a fibrous web in a contracoater and, FIG. 7 is a diagrammatic view showing the application of polyvinyl alcohol solution to a fibrous web in a three-roll, direct roll coater.

In FIG. 6 there is shown a four-roll reverse roll coater, also known as a contracoater, for applying polyvinyl alcohol solution to a fibrous web. The fibrous web 62 is fed over an idle roll 63 and around transfer roll 64, which is preferably a rubber or rubber coated roll. The apparatus includes a container 65 for the coating solution 66, viz a viscous aqueous solution of polyvinyl alcohol. A chrome-plated fountain roll 67 is arranged to pick up coating solution 66 and apply it to a chrome plated transfer roll 68. Adjacent to transfer roll 68 there is positioned a chrome-plated metering roll 69 which controls the thickness of film layer on transfer roll 68 for application to the fibrous web 62. Metering roll 69 is provided with doctor blade 70 for cleaning the surface thereof. After the web is coated by transfer roll 68 it passes into dryer 71 where it is thoroughly dried and cured and preferably reequilibrated with moisture. If desired, the coated and cured web may be reequilibrated with moisture in a separate conditioning step subsequent to the dryer.

Figure 7:
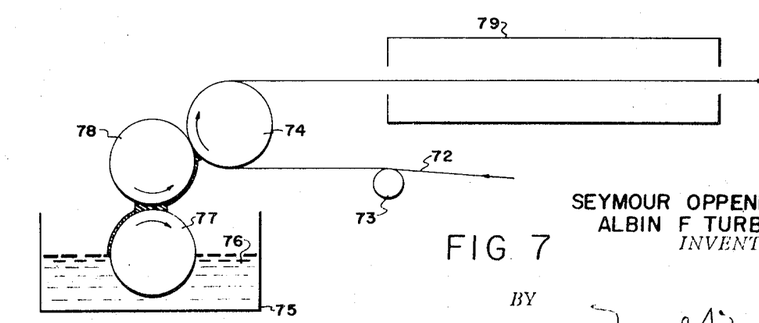

In FIG. 7 there is shown a three-roll direct roll coater for applying polyvinyl alcohol solution to a fibrous web. In this apparatus, the fibrous web 72 passes over guide roll 73 and around drive roll 74. The apparatus is provided with a container or receptacle 75 in which the coating solution 76, viz a viscous aqueous solution of polyvinyl alcohol, is positioned. Fountain roll 77 is positioned in coating solution 76 and is arranged upon rotation to apply the coating solution to transfer roll 78 which applies it to the surface of web 72 as the web passes around drive roll 74. The coated and impregnated web is passed into dryer 79 where it is thoroughly dried and cured and preferably is reequilibrated with moisture. If desired, the moisture reequilibration may take place in a separate treating step subsequent to the dryer.

PREPARATION OF POLYVINYL ALCOHOL FIBROUS CASINGS

A series of experiments were carried out in which a fibrous web was coated or impregnated with a viscous aqueous polyvinyl alcohol solution and dried and seamed to form a fibrous casing. In these experiments different polyvinyl alcohol compositions were evaluated and different plasticizers used to demonstrate the range of operability of the invention. The casing may be prepared at the time of impregnation of the fibrous web as described in connection with FIG. 1 of the drawings or the fibrous web may be coated by any of the procedures shown in FIGS. 2–7 of the drawings and subsequently seamed into fibrous casing using any of the well-known adhesives for polyvinyl alcohol.

The following nonlimiting examples are illustrative of the scope of this invention.

Example 1

In this example, a fibrous casing is prepared by impregnating and coating a fibrous paper with a polyvinyl alcohol solution.

A solution was prepared comprising 10 percent polyvinyl alcohol (D.S. above 99 percent) in water. The polyvinyl alcohol dissolves in hot water at about 90°–95° C. and remains in solution even when cooled. To this solution there is added 2.25 percent glycerol plasticizer, 0.4 percent formaldehyde and 0.22 percent lactic acid.

A ribbon of 15-lb. Dexstar long fiber hemp paper is removed from a storage roll and passed through an apparatus as shown in FIG. 1 and as described above. The paper is formed into a tube and the viscous polyvinyl alcohol solution is introduced through annular die 20 to saturate and coat the paper tube. As the tube passes downward through dryer 23 it is dried in air heated to 120° C. The tube then passes into curing oven 29 where it is cured at 140° C. to effect a thorough cross-linking of the film and to collapse the film to effect hydrogen bonding between the polyvinyl alcohol molecules. After curing, the polyvinyl alcohol casing is subjected to a humid atmosphere to remoisten the casing for flexibility and ease of handling.

The casing prepared in this manner has a wet thickness of 50 mils at the time of application of the polyvinyl alcohol coating solution. After drying and moisture equilibration the casing has a thickness of 4 mils. When the casing is rewet by soaking in water it swells to a thickness of about 6 mils. The casing has a break strength of about 20 lb./in. or about 3,300 p.s.i. This casing has an elongation at break of about 27 percent (as compared to about 60–70 percent for fibrous reinforced regenerated cellulose casing).

A polyvinyl alcohol-fibrous casing prepared as described above is first soaked in hot water and then stuffed with a bologan emulsion. The casing is tied at one end with a string and after thorough stuffing is closed at the other end with a Tipper clip. The casing is subjected to a normal cooking and smoking operation. There is no breakage of the casing observed and moisture and smoke penetration are about the same as a conventional fibrous cellulosic casing. The casing showed less than 3/16 in. variation in circumference for a 15 in. circumference casing as measured from end to end of a fully stuffed and processed bologna sausage.

Example 2

A solution is prepared of a polyvinyl alcohol having a D.S. of 98 percent following the procedure described in example 1. The solution comprises 10 percent polyvinyl alcohol, 2.25 percent glycerol, 0.4 percent formaldehyde and 0.22 percent lactic acid. The viscous polyvinyl alcohol solution thus prepared is applied to a 15-lb. Dexstar long fiber hemp paper on a knife over roll coater as shown in FIG. 2 and described above. The paper has a wet coated thickness of 50 mils and when dried has a thickness of about 4–5 mils. The paper has a rewet thickness of about 6 mils and a rewet strength of 17–21 lb./in. width and an elongation at break of 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed joint is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

Example 3

A solution is prepared of a polyvinyl alcohol having a D.S. of 88 percent following the procedure described in example 1. The solution comprises 10 percent polyvinyl alcohol, 2.25 percent glycerol, 0.4 percent formaldehyde and 0.22 percent lactic acid. The viscous polyvinyl alcohol solution thus prepared is applied to a 15-lb. Dexstar long fiber hemp paper on a floating doctor blade coater as shown in FIG. 3 and described above. The paper has a wet coated thickness of 50 mils and when dried has a thickness of about 4–5 mils. The paper has a rewet thickness of about 6 mils and a rewet strength of 17–21 lb./in. width and an elongation at break of 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed joint is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

Example 4

A solution is prepared of a polyvinyl alcohol having a D.S. of 86 percent following the procedure described in example 1. The solution comprises 10 percent polyvinyl alcohol, 2.25 percent glycerol, 0.4 percent formaldehyde and 0.22 percent lactic acid. The viscous polyvinyl alcohol solution thus prepared is applied to a 15-lb. Dexstar long fiber hemp paper on a continuous blanket knife coater as shown in FIG. 4 and described above. The paper has a wet coated thickness of 50 mils and when dried has a thickness of about 4–5 mils. The paper has a rewet thickness of about 7 mils and a rewet strength of 17–21 lb./in. width and an elongation at break of 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed joint is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

Example 5

A solution is prepared of a polyvinyl alcohol having a D.S. of 99 percent following the procedure described in example 1. The solution comprises 10 percent polyvinyl alcohol, 2.25 percent glycerol, 0.4 percent formaldehyde and 0.3 percent malic acid. The viscous polyvinyl alcohol solution thus prepared is applied to a 15-lb. Dexstar long fiber hemp paper on a three roll reverse roll coater as shown in FIG. 5 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a toluene diisocyanate (or other isocyanate adhesive) is applied as a seaming adhesive. As the adhesively seamed joint is formed the casing is heated to dry the adhesive and effect a tight seam. The casing which is formed does not tend to break across the seam when subjected to routine tensile tests.

The fibrous casing prepared in this example performs adequately when stuffed, cooked, and smoked as described in connection with the casing of example 1.

Example 6

A solution is prepared of a polyvinyl alcohol having a D.S. of 99 percent following the procedure described in example 1. The solution comprises 10 percent polyvinyl alcohol, 2.25 percent glycerol, 0.5 percent polyamide epichlorohydrin resin (Kymene 557). The viscous polyvinyl alcohol solution thus prepared is applied to a 15-lb. Dexstar long fiber hemp paper on a four roll reverse roll coater as shown in FIG. 6 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing an epoxy adhesive is applied as a seaming adhesive. As the adhesively seamed joint is formed the casing is heated to dry the adhesive and effect a tight seam. The casing which is formed does not tend to break across the seam when subjected to routine tensile tests.

The fibrous casing prepared in this example performs adequately when stuffed, cooked, and smoked as described in connection with the casing of example 1.

Example 7

A solution is prepared of a polyvinyl alcohol having a D.S. of 99 percent following the procedure described in example 1. The solution comprises 10 percent polyvinyl alcohol, 2.25 percent glycerol, 1.25 percent trimethylol melamine and 0.2 percent citric acid. The viscous polyvinyl alcohol solution thus prepared is applied to a 15-lb. Dexstar long fiber hemp paper on a three roll direct roll coater as shown in FIG. 7 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a cyanoacrylate ester adhesive is applied as a seaming adhesive. As the adhesively seamed joint is formed the casing is heated to dry the adhesive and effect a tight seam. The casing which is formed does not tend to break across the seam when subjected to routine tensile tests.

The fibrous casing prepared in this example performs adequately when stuffed, cooked, and smoked as described in connection with the casing of example 1.

Example 8

A solution is prepared of a polyvinyl alcohol having a D.S. 99 percent following the procedure described in example 1. The solution comprises 10 percent polyvinyl alcohol, 2.25 percent glycerol, 1.0 percent dimethylol urea and 0.2 percent lactic acid. The viscous polyvinyl alcohol solution thus prepared is applied to a 15-lb. Dexstar long fiber hemp paper on a four roll reverse roll coater as shown in FIG. 6 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed joint is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

Example 9

A solution is prepared of a polyvinyl alcohol having a D.S. of 99 percent following the procedure described in example 1. The solution comprises 10 percent polyvinyl alcohol, 2.25 percent glycerol, 5 percent glyoxal and 0.3 percent malic acid. The viscous polyvinyl alcohol solution thus prepared is applied to a 15-lb. Dexstar long fiber hemp paper on a four roll reverse roll coater as shown in FIG. 6 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed joint is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

Example 10

A solution is prepared of a polyvinyl alcohol having a D.S. of 99 percent following the procedure described in example 1. The solution comprises 10 percent polyvinyl alcohol, 2.25 percent glycerol, 5.5 percent glutaraldehyde and 0.2 percent malic acid. The viscous polyvinyl alcohol solution thus prepared is applied to a 15-lb. Dexstar long fiber hemp paper on a four roll reverse roll coater as shown in FIG. 6 and described above. The paper has a wet coated thickness of 50 mils and when dried has a thickness of about 4–5 mils. The paper has a rewet thickness of about 6 mils and a rewet strength of 17–21 lb./in. width and elongation at break of about 15–25 percent.

The impregnated, dried and cured paper is equilibrated with sufficient moisture to render it flexible and easy to handle by passing through a humid atmosphere. The impregnated paper is slit to the desired size, for any particular casing, and is formed into a continuous tube on a standard sealer for forming longitudinal seams in the manufacture of tubing. In the manufacture of this tubular casing a 10 percent solution of polyvinyl alcohol, plasticized with glycerol and containing formaldehyde and lactic acid is applied as a seaming adhesive. As the adhesively seamed join is formed the casing is heated to dry the adhesive and effect thorough cross-linking both within the adhesive to the surface being adhered. The casing which is formed does not tend to break across the seam when subjected to routine tensile tests.

The fibrous casing prepared in this example performs adequately when stuffed, cooked, and smoked as described in connection with the casing of example 1.

In the several examples given above the polyvinyl alcohol was provided with glycerol as a plasticizer. In carrying out the preparation of casings in accordance with this invention any plasticizer may be used which is suitable for producing a flexible film. Glycerol is the most widely used plasticizer for polyvinyl alcohol films but in general high boiling water soluble organic compounds containing hydroxyl, amide, or amino groups may be used. Suitable plasticizers include glycols and poly glycols, sorbitol, formamide, urea, etc.

The paper used in the above examples was a long fiber hemp paper. In general, any saturating tissue or nonwoven or woven web of suitable strength can be used. In some cases, a small amount of a surfactant or wetting agent may be added either before treatment or in admixture with the polyvinyl alcohol coating solution to effect a more thorough penetration of the polyvinyl alcohol solution into the web.

In the drying and curing of the coated and impregnated web, either as flat stock or as a casing, the product is dried for about 1 minute or more at 90°–120° C. and then cured by heating to a higher temperature, e.g., 140° C. more or less, for about 3 minutes or more. The precise heating and curing times and temperatures are dependent upon the concentration of the polyvinyl alcohol coating solution and at least partially upon the D.S. of the polyvinyl alcohol. The conditions are selected to effect thorough drying and curing of the polyvinyl alcohol film.

In preparing casings in accordance with this invention colored casings may be produced by incorporating F.D.A. and U.S.D.A. approved pigments in the polyvinyl alcohol coating solution. In particular, aluminum lake pigments of F.D.A. approved food dyes may be used.

The tubular casings produced in accordance with this invention are useful primarily for processing and packaging sausages such as bologna, etc. These casings may also be used for packaging food and other products. The casings are also useful as semipermeable membranes for purification of water by reverse osmosis and as hemodialysis membranes in artificial kidney machines.

We claim:

1. A synthetic meat casing comprising a tube of a long fiber saturating tissue longitudinally seamed and saturated and coated with a cross-linked polyvinyl alcohol having a D.S. of at least 80 percent with respect to OH groups.

2. A meat casing as defined in claim 1 in which the casing is formed into a tube at the time of saturation and coating.

3. A meat casing as defined in claim 1 in which the casing is saturated and coated as flat stock, dried, and subsequently formed into a tube with an adhesively bonded seam.

4. A meat casing as defined in claim 3 in which the adhesive used to form said seam is a polyvinyl alcohol or an adhesive chemically reactive with polyvinyl alcohol.

5. A method of preparing a synthetic meat casing comprising,
   a. saturating and coating a long fiber saturating tissue with an aqueous solution of a polyvinyl alcohol having a D.S. of at least 80 percent with respect to OH groups,
   b. drying and curing said saturated and coated tissue to produce a fiber reinforced polyvinyl alcohol film,
   c. forming said coated and saturated tissue longitudinally into a tube and forming a seam therein, and
   d. cross-linking the polyvinyl alcohol on said tissue to yield a reinforced film of low-water sensitivity.

6. A method as defined in claim 5 in which said polyvinyl alcohol is cross-linked by reaction with formaldehyde, glyoxal, glutaraldehyde, a diisocyanate, a diisothiocyanate, a poly epoxide, a polyamide epichlorohydrin, a polymethylol substituted water-soluble resin, a diacyl halide, or a polymeric ketene.

7. A method as defined in claim 5 in which a cross-linking agent is added in admixture with said polyvinyl alcohol solution.

8. A method as defined in claim 5 in which said casing is treated with a cross-linking agent prior to, during, or after drying.

9. A method as defined in claim 5 in which said casing is formed into a tube prior to drying.

10. A method as defined in claim 5 in which said polyvinyl alcohol has a D.S. of at least 98 percent.

11. A method as defined in claim 10 in which said casing is impregnated with a plasticizer for polyvinyl alcohol.

12. A method as defined in claim 5 in which said coated and saturated tissue is dried and subsequently formed into a tube having a longitudinal seam secured by adhesive.

13. A method as defined in claim 12 in which said adhesive is a polyvinyl alcohol or an adhesive chemically reactive with polyvinyl alcohol.

* * * * *

Disclaimer 3,640,735.—*Seymour Oppenheimer*, Chicago, and *Albin F. Turbak*, Danville, Ill. FIBROUS REINFORCED POLYVINYL ALCOHOL CASINGS. Patent dated Feb. 8, 1972. Disclaimer filed Mar. 23, 1973, by the assignee, *Tee-Pak, Inc.*

Hereby disclaims the portion of the term of the patent subsequent to Dec. 21, 1988.

[*Official Gazette May 22, 1973.*]